Patented Dec. 16, 1952

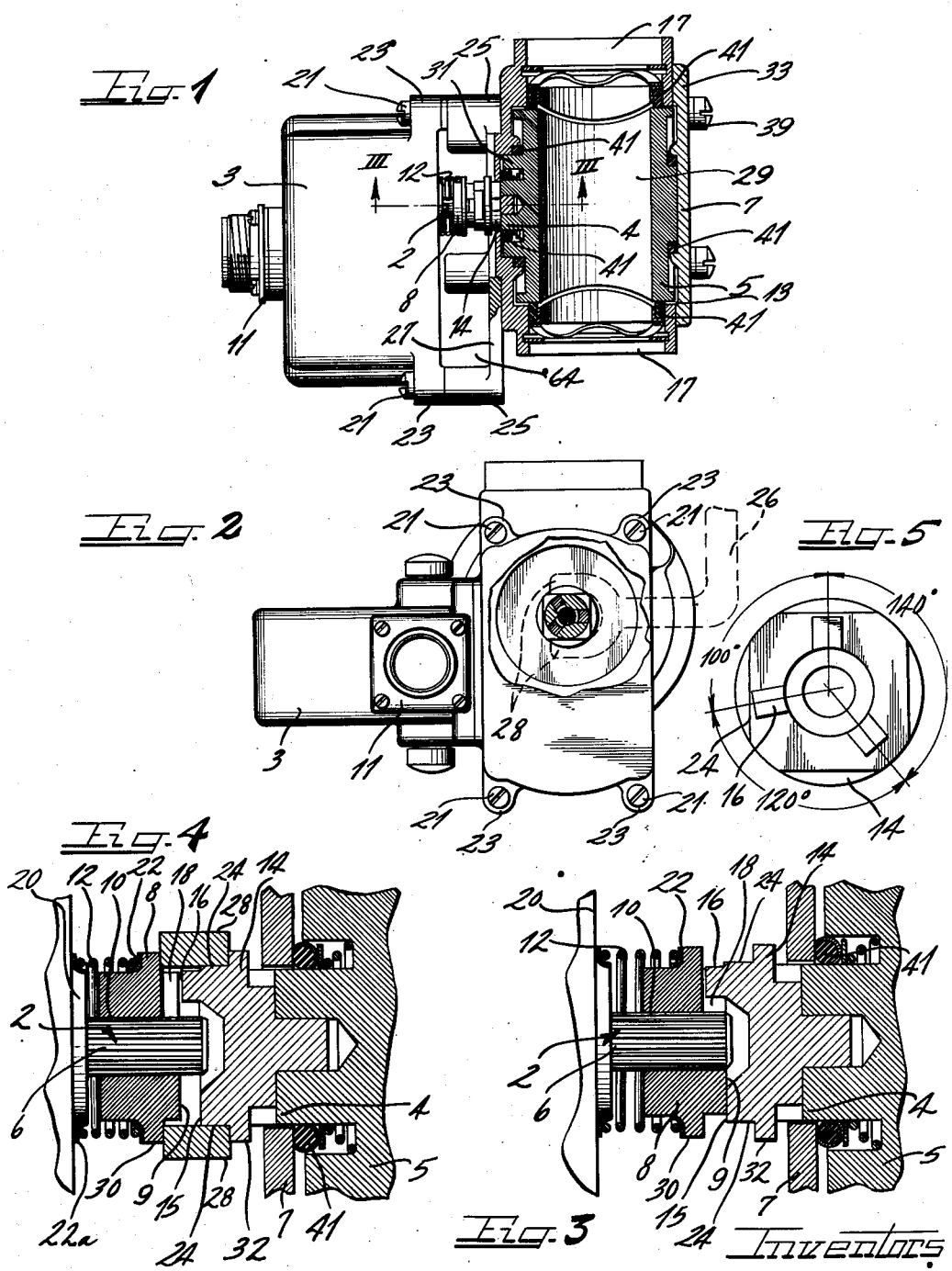

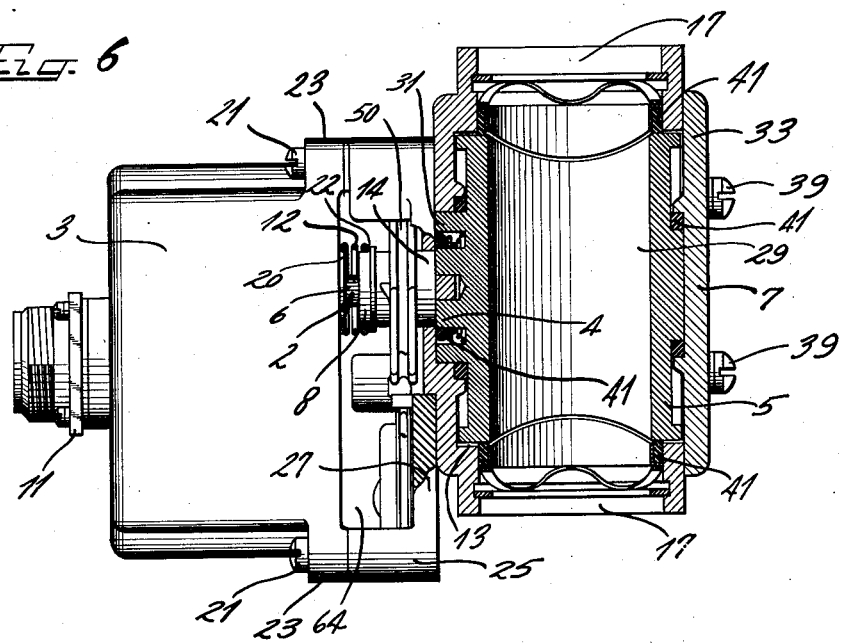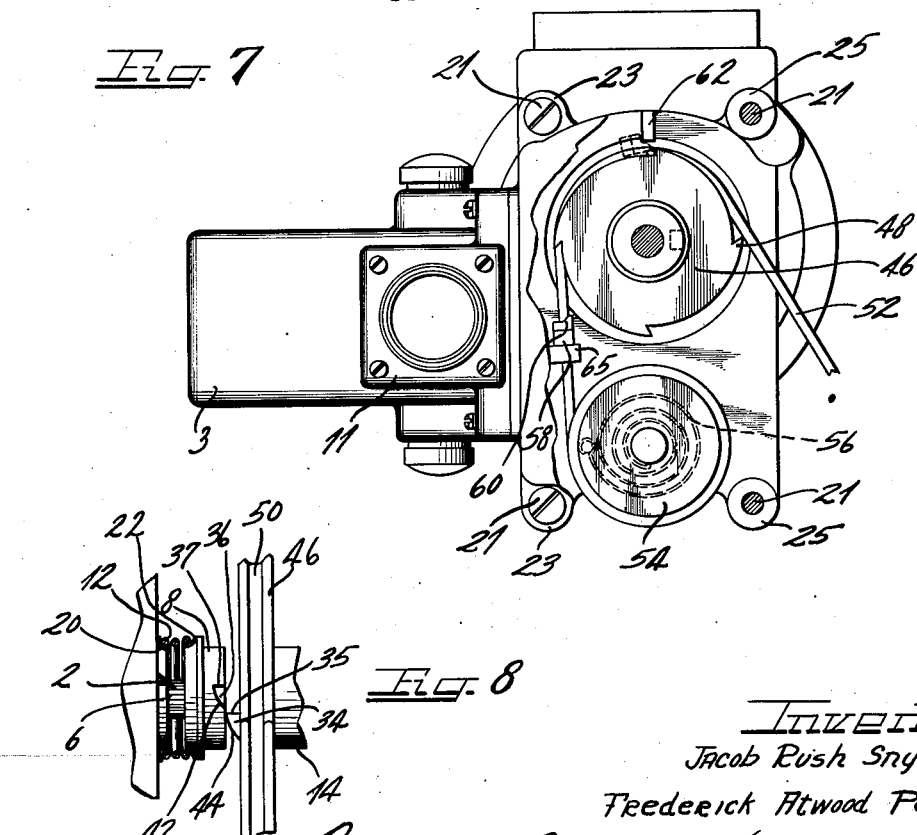

2,621,678

UNITED STATES PATENT OFFICE 2,621,678

DRIVE COUPLING

Jacob Rush Snyder, Cleveland, and Frederick Atwood Pease, Jr., Cleveland Heights, Ohio, assignors to Thompson Products, Inc., Cleveland, Ohio, a corporation of Ohio Application December 21, 1945, Serial No. 636,430

8 Claims. (Cl. 137—720)

This invention relates to a coupling device for rotating shaft-like members and particularly to a coupling device normally connecting a driving member with a rotatable driven member, which is arranged to permit expeditious manual rotation of the driven member independently of the driving member.

In many motor driven devices, and particularly where the driving mechanism includes a gear reduction unit, it is often desired to rotate the driven member manually, particularly when failure of the driving mechanism occurs. When no quick-disconnecting coupling device is provided between the driving and driven members, such manual rotation requires an excessive force especially when manually rotating the driven member directly, due to the large gear ratios generally involved. In still other cases, it is frequently desired to manually adjust the angular relationship of the driven member relative to the driving member for some purpose, and then recouple the driven member to the driving member in the identical angular relationship as existed prior to the uncoupling of such members. This latter operation is of particular utility in the operation of motor driven valves wherein a fixed angular relationship must be maintained between the motor and the operating shaft of the valve, yet it is often desirable to manually operate the valve independently of the motor.

According to one embodiment of this invention, a coupling plate is affixed to the driven member for corotation while a second coupling plate is slidably mounted on the shaft of a driving member but is rotatable with such driving member. Such driven member may comprise the operating post of a valve and the driving member the output shaft of a motor driven speed reducing unit. A spring is provided urging the second coupling plate axially relative to the driving member and into abutting or adjacent relationship with the first coupling plate secured to the driven member. One or more axially extending peripheral recesses are provided in one of the coupling plates and a corresponding number of axially parallel projecting lugs are provided on the other coupling plate, located so as to engage in the recesses of the other coupling plate in the adjacent coupled position of such coupling plates. While not limited thereto, the spacing of the recesses and cooperating lugs is preferably non-uniform about the periphery of the coupling plates, thereby insuring that such plates will be secured together in only one predetermined angular relationship.

In the event, however, that it is desired to angularly index the driven member through a plurality of equal angular movements relative to the driving member, then the spacing of the lugs and recesses about the axis of the coupling plates should be uniform and angularly separated by the amount of the desired angular indexing.

The end of the first coupling plate secured to the driven member is provided with any suitable type of tool engaging surface such, for example, as a plurality of opposed flat surfaces which may be conveniently engaged by a wrench-like tool. An external flange is provided on each of the coupling plates and such flanges are located so as to lie on each side of the tool engaging surfaces. The spacing between such flanges is proportioned relative to the extent of engagement of the projecting lugs in the recesses so that the insertion of a wrench between such flanges will displace the two coupling plates relative to each other a sufficient axial distance to disengage the projecting lugs from the recesses, thereby disconnecting the driven member from the driving member. After insertion of the wrench between the flanges of the coupling plates, the wrench may be engaged on the tool-receiving surfaces and the driven member rotated by such wrench.

In accordance with a further embodiment of this invention, similar coupling plates as heretofore described are provided respectively on the driving and driven members. The coupling plate mounted on the driving member is axially movable relative thereto and is spring-biased into abutting relationship with the coupling plate on the driven member. A projecting lug on one of such coupling plates cooperates with a recess in the other plate to secure the driving and driven members together for rotation in the direction of the driving member. However, one wall of the recess and the corresponding edge of the lug are shaped to form cooperating cam surfaces which, when the driven member is rotated relatively ahead of the driving member, produces an axial displacement of one coupling plate relative to the other sufficient to disengage the lug from the cooperating recess and thus uncouple the driving and driven members. To accomplish the rotation of the driven member relative to the driving member, a ratchet is formed on the driven member and this ratchet has a peripheral groove formed thereon which bifurcates all of the teeth of the ratchet. A cord-like member is then mounted in at least a portion of such peripheral groove and a pawl is secured to the cord. Thus manual pulling of the cord engages the pawl with the teeth of the ratchet, hence rotation of the ratchet, hence rotation of the driven member ahead of the driving member, thereby effecting uncoupling of the coupling plates. The other end of the cord on which the pawl is secured is fastened to a spring-biased reel which, when the cord is manually released, winds up the cord restoring the pawl to an inoperative positive relative to the ratchet.

In the specific application of the second modification of this invention to a motor driven valve, a stop may be provided which is engageable by the pawl as the cord is pulled, thereby limiting the angular movement of the valve post to an amount coincident with the angular separation of two distinct operating positions of such valve post.

Accordingly, it is an object of this invention to provide an improved quick-disconnecting coupling device for shaft-like rotating members characterized by its ease and reliability of operation and simplicity of construction.

A further object of this invention is to provide a quick-disconnecting coupling device for rotating shaft-like members which permits such members to be expeditiously manually uncoupled and then recoupled in identical angular relationship.

One particular object of this invention is to provide a quick-disconnecting coupling device between rotatable driving and driven members wherein the application of a wrench to the driven member to manually rotate such member automatically effects uncoupling of such member from the driving member.

Another particular object of this invention is to provide a quick-disconnecting coupling device between rotatable driving and driven members wherein the manual pulling of a cord-like member effects uncoupling of the driving and driven members and rotates the driven member independently of the driving member.

A further object of this invention is to provide an improved pawl and detent device for rotating a rotatable body by pulling of a cord-like member.

A specific object of this invention is to provide a drive coupling between a motor driven speed reducing device and the operating post of a rotatable valve member, wherein the drive coupling permits expeditious manual uncoupling of the operating post and rotation of the operating post manually and independently of the speed reducing device, and further such drive coupling permits recoupling of the operating post only in the same angular relationship to the speed reducing device as existed prior to uncoupling.

Other and further objects of the invention will be apparent to those skilled in the art from the following detailed description of the annexed sheets of drawings which by way of preferred examples only illustrate two embodiments of the invention.

On the drawings:

Figure 1 is an elevational view, partly in section, of a valve, a motor driven speed reducing device and drive coupling in assembled relation;

Figur 2 is a side elevational view of Figure 1, partly in section and with the operating wrench indicated in phantom;

Figure 3 is an enlarged partial sectional view of Figure 1, taken on the plane III—III thereof and showing the elements of the coupling device in their coupled positions;

Figure 4 is a view similar to Figure 3 but showing a wrench in engagement with elements of the coupling device and such elements in their uncoupled positions;

Figure 5 is an enlarged view of the end face of one of the coupling plates, with other associated parts deleted for clarity;

Figure 6 is a view similar to Figure 1 but incorporating a modification of the drive coupling;

Figure 7 is a side elevational view of Figure 6 having portions thereof cut away for clarity; and Figure 8 is an enlarged elevational view of the drive coupling utilized in Figure 6.

Referring to Figures 1 through 5 of the drawings, there is shown a driving member or shaft 2 coaxially disposed in adjacent relationship to a driven member or shaft 4. By way of example, the driving member 2 may comprise the output shaft of an electric motor driven speed reducing unit (not shown) disposed within the housing 3, while the driven member 4 may comprise the operating post of a rotatable valve plug 5 disposed within a valve housing 7.

A conventional wiring receptacle 11 may be provided on housing 3 to receive the electric cables (not shown). Motor housing 3 is conveniently secured to valve housing 7 by a plurality of screws 21 threadably connecting spaced lugs 23 integrally formed on motor housing 3 with correspondingly spaced upstanding lugs 25 integrally formed on a spacer plate 27 which is in turn secured to valve housing 7 by suitable screws 39.

Valve housing 7 comprises a hollow casing defining a cylindrical chamber 13 to accommodate rotatable valve member 5 and further defines two or more ports 17 communicating with chamber 13 and which are generally radially disposed relative to the operating post 4. The rotatable valve element 5 is integrally formed with operating post 4 and comprises a cylindrical member arranged to rotate within chamber 13 of the valve housing 7. To interconnect the ports 17, a hole 29 is provided through rotatable valve element 5 transverse to the axis thereof. Hence, the relative angular position of rotatable valve element 5 with respect to ports 17 determines whether such ports are interconnected or shut off.

A flange 31 surrounding operating post 4 journals one end of valve element 5 while the other end is suitably journaled in an end plate 33 which is secured to valve housing 7 by suitable screws (not shown). Suitable gaskets 41 are provided in cooperative relation between valve housing 7 and rotatable valve element 5 to prevent fluid leakage.

The end of driving shaft 2 is provided with longitudinal splines 6 and on this splined end a coupling plate 8 having a splined bore 10 is slidably mounted for axial movement relative to driving shaft 2.

A coupling plate 14 is affixed on the end of the driven shaft or operating post 4. A plurality of lugs 16 are provided on the end face 15 of coupling plate 14 projecting in an axially parallel direction toward the end face 9 of coupling plate 8. A plurality of recesses 18 are provided in the face of coupling plate 8, and such recesses are spaced and shaped to respectively receive the lugs 16 in engagement therein. A spring 12, operating between a washer 22a on shoulder 20 on driving shaft 2 and a washer 22 on flange 30 on coupling plate 8, biases coupling plate 8 tofor example, between a fully opened and a fully closed position.

Upon release of pulling force applied to the free end of the cord 52, the reel 54 returns the pawl 58 to an inoperative position relative to the ratchet 46 against stop lug 65 rigidly secured to spacer plate 27, winding the cord 52 on itself under the bias of spring 56.

To return the driving and driven members to their coupled state, the ratchet 46 is successively advanced by pulling and releasing the cord 52 until the lug 34 is aligned with recess 36. Thereupon, the coupling plate 8 automatically moves axially into coupled relationship with coupling plate 14 under the bias of spring 12. Thus the drive motor and rotatable valve element are recoupled in identical angular relationship that existed prior to uncoupling. This relationship may also be brought about by the electrical rotation of the coupling plate 8.

In both of the described modifications it should be noted that the drive coupling is located in the space between the speed reducing unit housing 3 and the valve housing 7. Such space is of course provided by the spacer plate 27 and the radially disposed openings 64 between the upstanding lugs 25 on the spacer plate permit convenient manual access to the elements of the drive coupling.

From the foregoing description, it is apparent that this invention provides a simple and inexpensive quick-disconnecting coupling device for rotatable shaft-like members. Such coupling device is particularly susceptible to manual operation and permits uncoupling to be accomplished by few and simple manual movements; simultaneously the angular relationship of the driven member may be changed relative to the driving member.

It will, of course, be understood that various details of construction may be varied through a wide range without departing from the principles of this invention, and it is, therefore, not the purpose to limit the patent granted hereon otherwise than necessitated by the scope of the appended claims.

We claim as our invention:

1. In combination, a rotatable driving member, a rotatable driven member, a first coupling plate rotatable with said driving member, a second coupling plate rotatable with said driven member, at least one of said coupling plates being axially movable relative to its respective rotatable member, resilient means urging said coupling plates axially into coupled relationship, one of said coupling plates having a recess in the coupling face thereof, said other of said coupling plates having a projecting lug engageable in said recess in the coupled position of said coupling plates, cooperating axially inclined cam surfaces on one wall of said recess and one edge of said lug respectively, said cam surfaces being engageable upon relative rotation of said driven member ahead of said driving member, means for producing relative rotation of said driven member ahead of said driving member, whereby said cam surfaces produce an axial displacement of said coupling plates sufficient to withdraw said lug from said recess, and spring-urged means for restoring said last mentioned means to an inoperative position.

2. In combination, a rotatable driving member, a rotatable driven member, a first coupling plate rotatable with said driving member, a second coupling plate rotatable with said driven member, at least one of said coupling plates being axially movable relative to its respective rotatable member, resilient means urging said coupling plates axially into coupled relationship, one of said coupling plates having a recess in the coupling face thereof, said other of said coupling plates having a projecting lug engageable in said recess in the coupled position of said coupling plates, cooperating axially inclined cam surfaces on one wall of said recess and one edge of said lug respectively, said cam surfaces being engageable upon relative rotation of said driven member ahead of said driving member, a ratchet secured to said driven member in coaxial relation, a manually movable pawl engageable with said ratchet to rotate said driven member relatively ahead of said driving member, whereby said cam surfaces produce an axial displacement of said coupling plates sufficient to withdraw said lug from said recess, and spring-urged means for restoring said pawl to an inoperative position relative to said ratchet.

3. In combination, a rotatable driving member, a rotatable driven member, a first coupling plate rotatable with said driving member, a second coupling plate rotatable with said driven member, at least one of said coupling plates being axially movable relative to its respective rotatable member, resilient means urging said coupling plates axially into coupled relationship, one of said coupling plates having a recess in the coupling face thereof, said other of said coupling plates having a projecting lug engageable in said recess in the coupled position of said coupling plate, cooperating axially inclined cam surfaces on one wall of said recess and one edge of said lug respectively, said cam surfaces being engageable upon relative rotation of said driven member ahead of said driving member, a ratchet secured to said driven member in coaxial relation and having a peripheral groove thereon, a cord-like member having a portion thereof engageable in said groove, a pawl secured to said cord-like member and arranged whereby pulling of said cord-like member engages said pawl with said ratchet to rotate said driven member relatively ahead of the driving member, whereby said cam surfaces produce an axial displacement of said coupling plates sufficient to withdraw said lug from said recess, and a spring-actuated reel engaging said cord-like member to restore said pawl to an inoperative position relative to said ratchet.

4. In combination, a rotatable driving member, a rotatable driven member, a first coupling plate rotatable with said driving member, a second coupling plate rotatable with said driven member, at least one of said coupling plates being axially movable relative to its respective rotatable member, resilient means urging said coupling plates axially into coupled relationship, one of said coupling plates having a recess in the coupling face thereof, said other of said coupling plates having a projecting lug engageable in said recess in the coupled position of said coupling plate, cooperating axially inclined cam surfaces on one wall of said recess and one edge of said lug respectively, said cam surfaces being engageable upon relative rotation of said driven member ahead of said driving member, a ratchet secured to said driven member in coaxial relation and having a peripheral groove thereon, a cord-like member having a portion thereof engageable in said groove, a pawl secured to said cord-like member and arranged whereby pulling of said cord-like member engages said pawl with said ratchet to rotate said driven member relatively ahead of the driving member, whereby said cam ward abutting or adjacent relationship with coupling plate 14 in which position the lugs 16 are engaged in the recesses 18. Thus the coupling plates are coupled together for rotation and hence the driving and driven members are connected for co-rotation.

It will be obvious to one skilled in the art that the mounting arrangement of the coupling plates 8 and 14 could be reversed without detriment to their operation, i. e., the coupling plate 8 could be secured while the coupling plate 14 is axially movable.

The spacing of the lugs 16 and the recesses 18 about the axis of their respective coupling plates is shown in Figure 5 as non-uniform. Such non-uniform spacing insures that the driving and driven members will always be connected together in identical angular relationship. In the event that it is desired to index the driven member relative to the driving member through a plurality of successive equal angular increments, then the spacing of the lugs 16 and recesses 18 should be uniform and angularly separated by the amount of the desired angular indexing.

The coupling plate 14, which is secured to the driven member 4, has formed on its periphery, adjacent its end face 15, tool-receiving surfaces 24, which may comprise opposed flat surfaces suitably spaced about the periphery of coupling plate 14 to permit such surfaces to be readily engaged by the jaws 28 of a wrench-type tool 26.

A flange 30 is provided adjacent the end face 9 of coupling plate 8 and likewise a flange 32 is provided on coupling plate 14 adjacent the inside end of the tool-receiving surfaces 24. The separation of the flanges 30 and 32 in the coupled position of the coupling plates is preferably proportioned to be substantially less than the width of the jaws 28 of the tool 26, and also proportioned relative to the extent of engagement of the lugs 16 in the recesses 18 so that upon the insertion of the jaws 28 of tool 26 between the flanges 30 and 32, as illustrated in Figure 4, the lugs 16 will be completely withdrawn from the recesses 18 and thus the driven member uncoupled from the driving member. The insertion of the tool jaws 28 between the flanges 30 and 32, of course, produces an axial movement of coupling plate 8 away from coupling plate 14 which is resisted by the bias of spring 12.

The driven member may then be conveniently rotated manually by the wrench or tool 26 operating on surfaces 24 and it should be noted that such rotation can be accomplished with very little effort since the driving member and its usually connected gear train are completely separated from the driven member. When it is desired to restore the driving and driven members to their coupled relationship, it is merely necessary to rotate the driven member to the position where the lugs 16 align with the recesses 18. Thereafter, the removal of the tool 26 from between the flanges 30 and 32 will immediately permit the coupling plates 8 to move axially toward plate 14 under the force of spring 12 to return to the coupled relationship as soon as the lugs and recesses are aligned. The lugs and recesses may also be realigned by electrical rotation of the driving member 2 and coupling plate 8.

The non-uniform spacing of the lugs 16 and the recesses 18 insures that the driving and driven members are recoupled in the identical angular relationship as existed prior to uncoupling. This feature is of particular advantage in the operation of motor driven valves for, as is commonly known, the control circuit (not shown) for the driving motor operates properly only when a fixed angular relationship exists between the rotatable valve element and the driving motor. Hence, a drive coupling in accordance with this invention prevents manual operation of the valve from interfering with subsequent remotely controlled motor driven operation.

In the modification disclosed in Figures 6 through 8, wherein identical numerals refer to parts similar to those described in connection with Figures 1-5, the driving member or shaft 2 and the driven member or operating post 4 are again provided with coupling plates 8 and 14, respectively. Coupling plate 8 is slidably mounted upon the splined end 6 of the driving shaft 2 and is biased into abutting or adjacent relationship with coupling plate 14 by spring 12. Coupling plate 14 is again provided with one or a plurality of axially parallel projecting lugs 34, while coupling plate 8 is provided with corresponding recesses 36 to receive such lugs in the coupled position of the coupling plates.

In this modification, one wall 37 of recess 36 and the corresponding edge 35 of the lug 34 are disposed in general radial relationship with respect to the axis of the driving member. Hence, the driving member will drive the driven member in one direction. The opposite wall 42 of the recess 36 and the opposite edge 44 of the lug 34 are, however, axially inclined and shaped to provide cooperating cam surfaces which, when the driven member is rotated relative to the driving member in the same direction, or in other words, ahead of the driving member, will produce a camming action between the coupling plates 8 and 14, moving coupling plate 8 axially away from coupling plate 14 against the bias of spring 12. Thus, the driving and driven members may be readily uncoupled when the driving member is at rest by manual rotation of the driven member ahead of the driving member, or conversely, by rotating the driving member relative to the driven member in a reverse direction.

To accomplish the uncoupling relative rotation of the driving and driven members, a ratchet 46 is formed on the periphery of coupling plate 14. Such ratchet is provided with a plurality of peripherally spaced teeth 48 and a peripheral groove 50 is provided therein which bifurcates all of the teeth 48. For convenient manual rotation of the ratchet 46, a cord 52 is utilized which at least partially surrounds the ratchet 46, lying in the groove 50. One end of the cord 52 is secured by torsion spring 56 in a direction tending to wind the cord 52 thereon.

Intermediate the reel 54 and the ratchet 46, a pawl 58 is rigidly secured to the cord 52. The forward face 60 of the pawl 58 is suitably shaped to engage the teeth 48 of the ratchet 46. Thus, upon manually or otherwise pulling of the free end of cord 52, the pawl 58 will be advanced into engagement with the teeth 48 of ratchet 46 and the ratchet rotated. Hence, the driven member is conveniently manually rotated.

If desired, a stop 62 may be fixedly secured to the spacer plate 27 in the path of movement of the pawl 58 as it rotates the ratchet 46. The stop 62 thus insures that the driven member may be successively advanced by only a predetermined increment. The extent of rotation permitted by stop 62 may conveniently be selected to permit operation of rotatable valve element between two successive angularly displaced operative positions.

surfaces produce an axial displacement of said coupling plates sufficient to withdraw said lug from said recess, a fixed stop member disposed in the rotative path of said pawl to limit the rotation producing movement of each actuation of said pawl, and spring urged means engageable with said cord-like member to return said pawl to an inoperative position relative to said ratchet upon release of pulling force on said cord-like member.

5. In combination, a driving member, a rotatable driven member, a one-way coupling device constructed and arranged to secure said driven member to said driving member in predetermined angular relationship for one direction of rotation of said driven member and to disconnect said driven member from said driving member for independent rotation by relative rotation of said driven member ahead of said driving member, a ratchet secured to said driven member in coaxial relation, and a manually movable pawl engageable with said ratchet to rotate said driven member ahead of said driving member, whereby actuation of said pawl uncouples said driven member and rotates said driven member relative to said driving member.

6. In combination, a driving member, a rotatable driven member, a one-way coupling device constructed and arranged to secure said driven member to said driving member for one direction of rotation of said driven member and to disconnect said driven member from said driving member by relative rotation of said driven member ahead of said driving member, a ratchet secured to said driven member in coaxial relation, said ratchet having a peripheral groove thereon, a cord-like member having a portion thereof engageable in said groove, a pawl secured to said cord and arranged whereby pulling of said cord engages said pawl with said ratchet to rotate said driven member ahead of said driving member, and a spring-actuated reel engaging said cord-like member to restore said pawl to an inoperative position relative to said ratchet.

7. In an electric motor driven valve apparatus of the type including an electric motor and a rotatable valve plug in a ported casing driven by the motor to various port controlling positions, the improvements of a splined drive shaft adapted to be rotated in coaxial disposition with a driven member, a first coupler adapted to be slidably splined on the drive shaft, a second coupler, a spring urging said first coupler axially into a coupled position relative to said second coupler, said couplers having interfitting drive connections thereon engageable in said coupled position, cam means for moving said first coupler axially out of coupled relationship with said second coupler upon relative rotation of said second coupler ahead of said first coupler, and manually operable means for rotating said second coupler ahead of said first coupler including a ratchet having a driving connection with said second coupler and having a peripheral groove thereon, a cord-like member having a portion thereof engageable in said groove, a pawl secured to said cord-like member and arranged whereby pulling of said cord-like member engages said pawl with said ratchet to rotate said second coupler in increments corresponding to an angular spacing pattern, and a spring actuated reel engaging said cord-like member to restore said pawl to an inoperative position relative to said ratchet.

8. In an electric motor driven valve apparatus of the type including an electric motor and a rotatable valve plug in a ported casing driven by the motor to various port controlling positions, the improvements of a splined drive shaft, a first coupler adapted to be slidably splined on the drive shaft, a second coupler, a spring urging said first coupler axially into a coupled position relative to said second coupler, said couplers having interfitting drive connections thereon engageable in said coupled position, cam means for moving said first coupler axially out of coupled relationship with said second coupler upon relative rotation of said second coupler ahead of said first coupler, and manually operable means for rotating said second coupler ahead of said first coupler including a ratchet having a driving connection with said second coupler in coaxial relation and having a peripheral groove thereon, a cord-like member having a portion thereof engageable in said groove, a pawl secured to said cord-like member and arranged whereby pulling of said cord-like member engages said pawl with said ratchet to rotate the second coupler, and a stop member disposed in the rotative path of said pawl about said ratchet, said stop member being located in predetermined relationship relative to the pawl to limit the rotation of said second coupler.

JACOB RUSH SNYDER.
FREDERICK ATWOOD PEASE, Jr.

REFERENCES CITED

The following references are of record in the file of this patent:

UNITED STATES PATENTS

| Number | Name | Date |
|---|---|---|
| 284,475 | Perkins | Sept. 4, 1883 |
| 577,490 | McGuire et al. | Feb. 23, 1897 |
| 801,012 | Howard | Oct. 3, 1905 |
| 937,127 | West | Oct. 19, 1909 |
| 980,502 | Dunkel | Jan. 3, 1911 |
| 1,193,008 | Fuller | Aug. 1, 1916 |
| 1,405,001 | Reichelt | Jan. 31, 1922 |
| 1,409,103 | Hawthorne | Mar. 7, 1922 |
| 1,462,879 | Woodward | July 24, 1923 |
| 1,502,915 | Neuwerk | July 29, 1924 |
| 1,953,182 | Lyon | Apr. 3, 1934 |
| 2,203,233 | Panish | June 4, 1940 |
| 2,390,882 | Hopkins | Dec. 11, 1945 |

FOREIGN PATENTS

| Number | Country | Date |
|---|---|---|
| 24,297 | Great Britain | of 1915 |
| 83,384 | Austria | of 1921 |
| 154,063 | Switzerland | of 1932 |
| 334,778 | Great Britain | Sept. 11, 1930 |
| 411,370 | Great Britain | of 1934 |